US008603621B2

(12) United States Patent
Tetrault

(10) Patent No.: US 8,603,621 B2
(45) **Date of Patent: *Dec. 10, 2013**

(54) WRITING KIT WITH PLASTIC SHEETS

(76) Inventor: Kenneth R. Tetrault, Lancaster, NH (US)

( * ) Notice: Subject to any disclaimer, the term of this patent is extended or adjusted under 35 U.S.C. 154(b) by 224 days.

This patent is subject to a terminal disclaimer.

(21) Appl. No.: 12/818,418

(22) Filed: Jun. 18, 2010

(65) Prior Publication Data

US 2010/0260534 A1 Oct. 14, 2010

Related U.S. Application Data

(63) Continuation of application No. 11/355,450, filed on Feb. 16, 2006, now Pat. No. 7,776,788, and a continuation-in-part of application No. 10/141,084, filed on May 9, 2002, now Pat. No. 7,056,860.

(60) Provisional application No. 60/289,516, filed on May 9, 2001.

(51) Int. Cl.

| | |
|---|---|
| ***B32B 3/26*** | (2006.01) |
| ***B32B 3/00*** | (2006.01) |
| ***B42F 3/00*** | (2006.01) |
| ***B42F 13/00*** | (2006.01) |
| ***B42D 1/00*** | (2006.01) |
| ***B42D 3/00*** | (2006.01) |

(52) U.S. Cl.
USPC ........... 428/304.4; 428/204; 402/70; 402/73; 281/21.1; 281/29; 281/39; 281/42; 281/43

(58) Field of Classification Search
USPC ........... 402/70, 73, 57; 503/201, 204; 428/13, 428/195.1, 204, 304.4; 281/21.1, 29, 30, 281/39, 42, 43, 45
See application file for complete search history.

(56) References Cited

U.S. PATENT DOCUMENTS

| | | | | |
|---|---|---|---|---|
| 1,479,607 | A | 1/1924 | Inman | |
| 1,716,187 | A | 6/1929 | Preston | |
| 2,523,922 | A | 9/1950 | Neuschwander | |
| 3,246,653 | A | 4/1966 | Sexton | |
| 3,488,128 | A | 1/1970 | Guntz | |
| 4,231,174 | A * | 11/1980 | Thompson | 40/661.01 |
| 5,050,846 | A * | 9/1991 | Goodman et al. | 256/1 |
| 5,110,232 | A | 5/1992 | Jermann | |
| 5,472,239 | A | 12/1995 | Trujillo | |
| D369,182 | S | 4/1996 | Walli, Jr. | |
| 5,916,280 | A * | 6/1999 | Lantz | 70/68 |
| 6,000,723 | A * | 12/1999 | Fujimoto | 281/38 |
| 6,045,285 | A | 4/2000 | Friedman | |
| 6,837,521 | B2 | 1/2005 | Legrand | |
| 7,776,788 | B2 * | 8/2010 | Tetrault | 503/201 |
| 2001/0027834 | A1 * | 10/2001 | Southwick | 150/108 |
| 2002/0167159 | A1 * | 11/2002 | Legrand | 281/21.1 |
| 2005/0230955 | A1 | 10/2005 | Mashimo | |

FOREIGN PATENT DOCUMENTS

ZA 9603941 A * 1/1997

* cited by examiner

*Primary Examiner* — Mark Ruthkosky
*Assistant Examiner* — Laura C Powers
(74) *Attorney, Agent, or Firm* — Simpson & Simpson, PLLC

(57) ABSTRACT

A writing kit including a plastic sheet, a binding and a case with a closing element to hold the plastic sheet in the case. The case has at least one hole at a center portion of the case and the sheet has at least one hole in the sheet. A binding comprising a flexible cord is laced through the hole in the sheet and the case and a clasp slidingly engages the cord.

20 Claims, 5 Drawing Sheets

WRITING KIT WITH PLASTIC SHEETS

CROSS-REFERENCE TO RELATED APPLICATIONS

This application is a continuation application under 35 USC 120 claiming priority of U.S. patent application Ser. No. 11/355,450, filed Feb. 16, 2006, which application is a continuation-in-part of U.S. patent application Ser. No. 10/141,084, filed May 9, 2002 which claims the benefit of U.S. application Ser. No. 60/289,516, filed May 9, 2001, which applications are incorporated herein by reference.

FIELD OF THE INVENTION

This invention relates generally to notebooks, more particularly to a writing kit including a case and binding for plastic sheets that is adjustable to fit one plastic page or a plurality of plastic pages, which is resistant to weather, water, and abusive treatment.

BACKGROUND OF THE INVENTION

Information may be recorded in certain circumstances by manually writing on paper or other surfaces, using ink pens, pencils, chalk, or other writing instruments. Various combinations of the writing instruments and writing surfaces can be used to produce different degrees of permanence, appearance, quality and clarity.

The applications in which information is written onto paper or another surface are varied. For example, consumers scribble shopping lists; coaches write plays; office workers take notes in meetings and students take notes in class; factory workers record production information; civilians and military personnel write down information in charts and reports, etc.

The writing implements for committing information onto paper and other surfaces are varied. Lead pencils are sometimes used, and are suitable for some applications, but in other situations ink is used. Numerous inks are commercially available.

In addition to having many different conventional writing tools from which to select, many different papers and other surfaces are available from which to select. Papers of various colors, thickness, appearance, durability and size are sold. Paper is sold in single sheets, in punched forms suitable for inserting in notebooks, in glue-bound tablets, in books, or in spiral-bound notebooks. Whichever paper is selected, recording information on paper is not without risk or disadvantage. For example, under certain conditions, ink on paper becomes illegible, or at least unsightly, distorted, or irregular, such as when the paper comes into contact with food, beverages and various other liquids and solids. Also, paper is not resilient to deterioration even if used as intended. Individual sheets of paper may be difficult to control, keep track of, or contain. Handled paper may look worn, dog-eared, and unprofessional.

Methods have developed, in certain applications, for writing onto non-paper surfaces, such as chalkboards, whiteboards and certain plastic sheets. The appearance and quality of the image, difficulty of use, permanence/removability, size and inconvenience of use, for the conventional non-paper systems have tended to limit their use to a narrow range of applications.

In many applications, paper has remained the predominant writing surface. For example, in the U.S. much or all of manual recording is done onto paper. A non-exhaustive list of examples in which military personnel record information onto paper, most often in handwritten form, includes: patrol coordination, patrol order, attack order, defense order, order annex, warning order, route card, fire plan sketch, range card, call for fire, close air support, close in fire support, communications and reporting, general information, guidelines for operation, and reconnaissance sketch/report. However, in military and security applications, writing on paper may be necessary in adverse conditions that can cause the information that was recorded to be lost or corrupted.

Some writing surfaces have been developed as alternatives to paper, including certain relatively unwieldy products that are disadvantageously thick, an example being PolyDura™, manufactured by J. L. Darling Corp. Another is Write-in-the-rain™ paper sold by J. L. Darling Corp (Washington), which is a paper that does not degrade in water. The Write-in-the-rain™ paper is a throwaway, one-time-use product, which tends to wick, and, once wetted and allowed to dry, will not return to its original manufactured state.

Just as conventional paper and writing surfaces are ill-suited to be utilized in various settings or weather conditions, the existing bindings and cases that hold them also lack the durability, resiliency, or adjustability to be used in harsh or punishing conditions. Traditional notebooks, which use metallic clasps that are spring loaded, have moveable parts that can rust and fail when subjected to wet conditions. Also, traditional metallic clasps can bend and deform when only a slight amount of weight is placed on top of the binding. Conventional notebooks that use metallic clasps that are spring loaded also are impractical in settings where silence is necessary, since such clasps can emit a loud snapping noise when they are closed. Moreover, a binding that can be deformed by pressure or corroded by weather is impractical and incompatible for outdoor use, or in situations where the book or case with the binding may be sat upon or placed under heavy equipment.

Attempts have been made to expand the conditions in which books can be used to include wet surroundings, as shown in U.S. Pat. No. 6,837,521 (Legrand). However, these attempts do not succeed in providing a book that can be used in harsh or punishing condition, let alone a writing kit. The pages described by Legrand are made of foam and are designed for a book meant to be safe for children, not a book or writing kit designed to be used in environments and conditions that are severe. Pages, bindings and books, such as those described in Legrand, would rip or deteriorate quickly if subjected to a harsh environment or punishing treatment. The pages of the book are not capable of providing a writing surface that can be written on with ink that is resistant to removal in wet conditions, yet removable with a solvent. Neither can the binding in Legrand, and books of that style, be adjusted to adapt to a change in the number of pages in the book. The number of pages in such books is fixed and unalterable.

U.S. Pat. No. 3,488,128 (Guntz) discloses a binder for looseleaf pages that can be adjusted to hold a range of pages. Guntz, and similar adjustable binding types (e.g., U.S. Pat. No. 1,479,607 and U.S. Pat. No. 1,716,187), offer binders that fail to provide an article that is suited for a severe environment or setting, or that can withstand punishing treatment. Existing adjustable binders have bindings that are prone to failure if they are subjected to challenging environments or conditions since they have securing means that are fragile. Another shortfall of these previous binders is that they fail to teach an adjustable binding combined with a writing kit that provides pages with sheets that are durable and can be re-used multiple times.

Military units need a writing kit to record and document information to effectively fulfill their missions and responsibilities, regardless of the harshness of the weather or surroundings. Bird watchers, environmentalists, campers, hikers, fisherman, outdoor enthusiasts, coaches or any other person that keeps notes in the outdoors also need a writing kit that can withstand punishing weather and treatment without having the information that was recorded corrupted or lost. Conventional or existing binders and writing kits fail to provide a durable, resilient option that still enables the accurate and up-to-date record keeping that is necessary in many fields. Existing writing kits are either missing one or more of the following factors: portability, a durable and protective case, an adjustable and resilient binding that can operate quietly, resilient writing sheets, or writing sheets that can capture writing in semi-permanent ink and be used over and over.

What is needed, then, is a writing kit containing pages resistant to failure in many climates and environmental conditions that can be written upon in ink that is semi-permanent and removable. Furthermore, the writing kit should have a binding and case that is resistant to wear and deformation in many weather and environmental conditions that operates quietly, and is fully adjustable to accommodate one to a plurality of pages.

SUMMARY OF THE INVENTION

The present invention broadly comprises a writing kit including at least one plastic sheet having at least one hole; a case having at least one hole at a center portion of the case and a closing element; and a binding comprising a flexible cord and a clasp. The cord is laced through the at least one hole in the sheet and through the at least one hole in the case. The clasp is slidingly engaged to the cord. In some aspects, the plastic sheet has at least two transparent outer layers and an opaque middle layer, the outer layers and the middle layer are fused together to form one solid sheet. The solid sheet has a writing surface that can receive semi-permanent ink, and from which the semi-permanent ink can be removed. In some aspects, the middle layer has a thickness of about 0.010" (10 mils) and the solid sheet has a thickness of about 0.014" (14 mils), the semi-permanent ink is waterproof, the plastic sheet is waterproof, upon perforation, the plastic sheet remains waterproof, or the plastic sheet is clear.

In some aspects, the plastic sheet further comprises a guide-mark for aligning at least one item separate from, but useable with, the writing sheet, the plastic sheet further comprises visual information permanently imbedded in the sheet. In some aspects the visual information is a map or the visual information is selected from the group consisting of: a template, a checklist and text. In some aspects the clasp is spring loaded or the closing element is a zipper, at least one button, or a hook and loop closure. In some aspects, the case further comprises an end and the kit further comprising a tab on the end. In some aspects, the kit includes a remover-solvent able to dissolve semi-permanent ink, a handheld writing instrument able to apply a semi-permanent mark. The writing instrument can be a pen with a relatively soft ink delivering tip. In some aspects, the case further comprises a pocket.

The present invention also broadly comprises a writing kit including a plastic sheet having at least two transparent outer layers and an opaque middle layer, a writing instrument able to apply a semi-permanent ink, a case having at least one hole at the center portion of the case and a closing element, and a binding comprising a flexible cord and a clasp. The outer layers and the middle layer are fused together to form one solid sheet, the solid sheet has a writing surface that can receive semi-permanent ink, and from which the semi-permanent ink can be removed, the cord is laced through the at least one hole is the sheet and through the at least one hole in the case, and the clasp slidingly engaged to the cord.

It is a general object of the invention to provide a writing kit having re-useable plastic pages, a case, and binding that are resistant to degradation in various harsh environmental conditions.

It is another object of the invention to provide a writing kit having a case and a binding that is adjustable to fit one page or a plurality of pages, is resilient to breaking, cracking, or deforming, and can be used quietly.

It is yet another object of the invention to provide a writing kit with pages having an imbedded text that can be written upon in semi-permanent ink which is resistant to smudging even in wet condition, but which is removable with a specified solvent.

These and other objects, features, and advantages of the present invention will become readily apparent to those having ordinary skill in the art upon reading the following detailed description of the invention in view of the several drawings of the invention.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
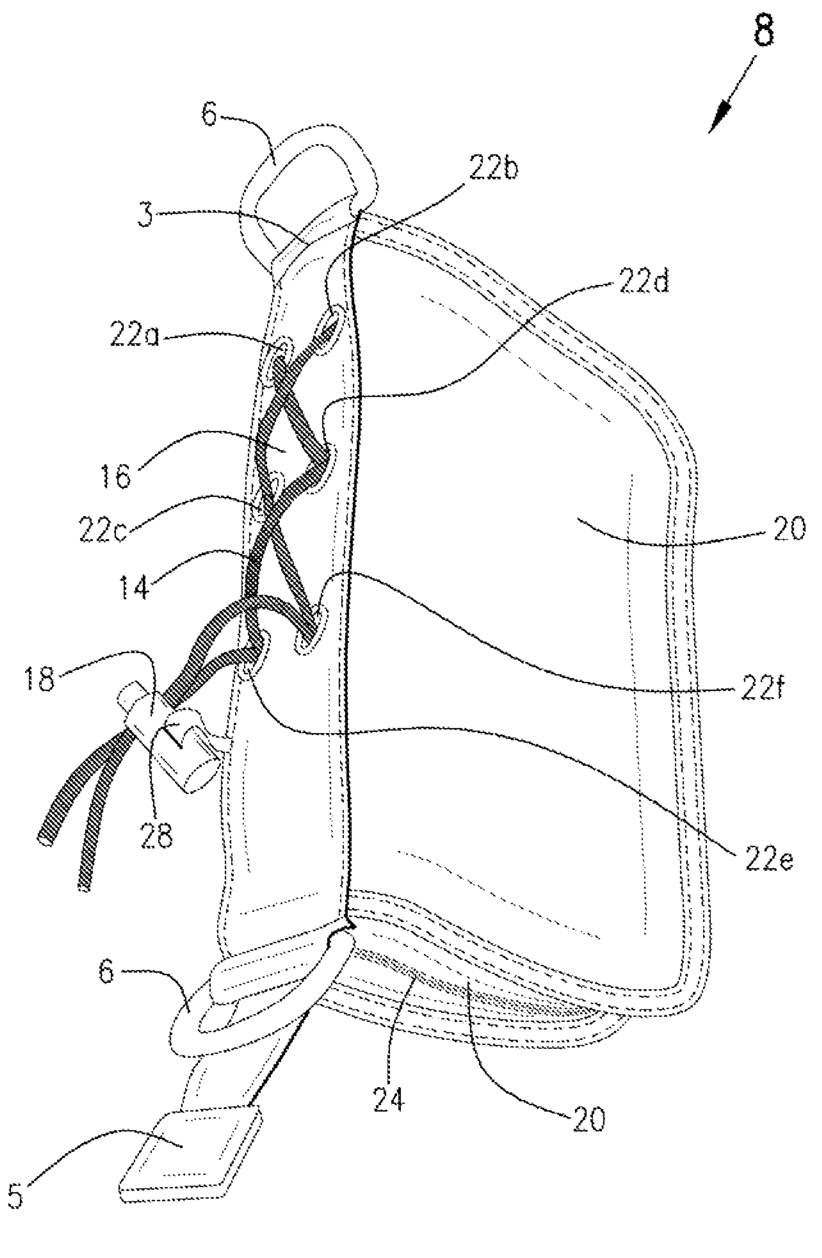
FIG. 1 is a perspective view of a writing kit according to the present invention as viewed from the rear with the case closed.

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments. In the description below, the terms "upper", "lower", "front", "back", "left", "right", and their derivatives, should be interpreted from the perspective of one viewing the writing kit shown in FIG. 1.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In one embodiment, the invention provides a writing sheet (such as a plastic page) and an ink-pen for writing thereon, such that the writing is semi-permanent, the semi-permanence being controllable. The semi-permanent writing is not removed by water, or by most liquids. The writing is easily removable by a remover-solvent according to the invention, and the solvent removes the ink without leaving a residue on the writing surface.

Preferably, as to weight, the writing sheet mirrors the weight of a sheet of paper. The writing surface may be in a range of flexibilities, such as from being flexible or relatively-flexible like some papers, to relatively rigid.

In another embodiment, the writing surface and ink pen are provided in a kit. A remover-solvent is optionally provided in the kit. A suitable combination of ink, remover-solvent and writing surface may be used, such that the ink withstands water and most liquids, is not susceptible of being smudged-off and is easily removable as desired by the remover-solvent without leaving a residue.

In some aspects, the writing surface is one that is only marginally affected by perforation, in that the writing surface retains all of its physical characteristics (waterproof and weatherproof-ness), the user only being affected if the damage to the writing surface occurs in an area that disrupts the functionality of the template, checklist or text, if any. This feature is unlike a conventional laminated paper which when perforated and exposed to water allows the paper to become saturated causing catastrophic failure of the page.

The writing surface used in the invention will not separate, unlike laminate on laminate bonds that separate over a relatively short period of time. The writing surface may be a single sheet of plastic, not susceptible to separation. Surfaces (such as many laminated surfaces) that are susceptible to separation are not suitable for use in the present invention.

A page used in the invention may be constructed using a substrate or core material that is impervious to water and weather. Thus, perforation of the product page does not cause product failure.

In the present invention, a page may be made by applying a plastic sheet to the substrate under conditions of temperature and pressure to form a single plastic page/sheet/writing surface. A page may be made by sandwiching a substrate between two respective plastic sheets under conditions of temperature and pressure to form a single plastic page/sheet/writing surface. The plastic page used in the present invention may be made from multiple pieces of plastic processed under heat and pressure to form a single piece of plastic with or without embedded text.

In making the page, a base page with text, such as artwork, may be provided. The digital artwork for such a base page may be created in high-resolution postscript format, such as by using QuarkXpress software, and may be electronically digitally imaged on litho negatives for transfer to printing plates. Any suitable lithographic materials including polyvinyl chloride (pvc) sheets, plates, inks, blankets, packings, etc. may be used for high density printing on co-polymer vinyl sheets, i.e., the material used for plastic credit cards and security ID cards. Pvc sheets and related materials used may be those with a relatively long drying time compared to paper.

As a base substrate for making a page according to the invention, preferably a base substrate vinyl is used, such as a rigid polyvinyl chloride, most preferably a rigid pvc manufactured by Klockner Pentaplast of America, Inc. (Gordonsville, Va.) such as Pentapharm, Pentafood, Pentaclear, Pentadur, Pentamed, Pentaform, Pentaprint, Pentatherm, Pentalan, Pentastat, Pentacard and Pentasound.

In cases where printing is done, after printing, the PVC sheets may be over-laminated in a hydraulic lamination press using thin clear UV inhibiting film covering the front and back of each sheet. The printing and covering method provides a clear film that protects the printed surface from scratches, scuffing, dirt and fading due to exposure to sunlight. Examples of a material used for over-laminating according to the invention is a pvc film selected from the group consisting of BVDC, BVRC, BPVC, BBBC, BBFC and BPG films of Nan Ya Plastics Corp. (Wharton, Tex.). There thus may be provided a vinyl sheet, and/or a high polish or matte surface that permits wiping of dirt, smudges and fingerprints. Where a large sheet (such as a sheet having 16 formats) is used, after formation of a single plastic writing surface sheets, the sheets may be die cut into smaller sized sheets, such as sheets sized for a certain notebook.

FIG. 1 is a perspective view of writing kit 8 according to the present invention as viewed from the rear with the case closed.

Figure 2:
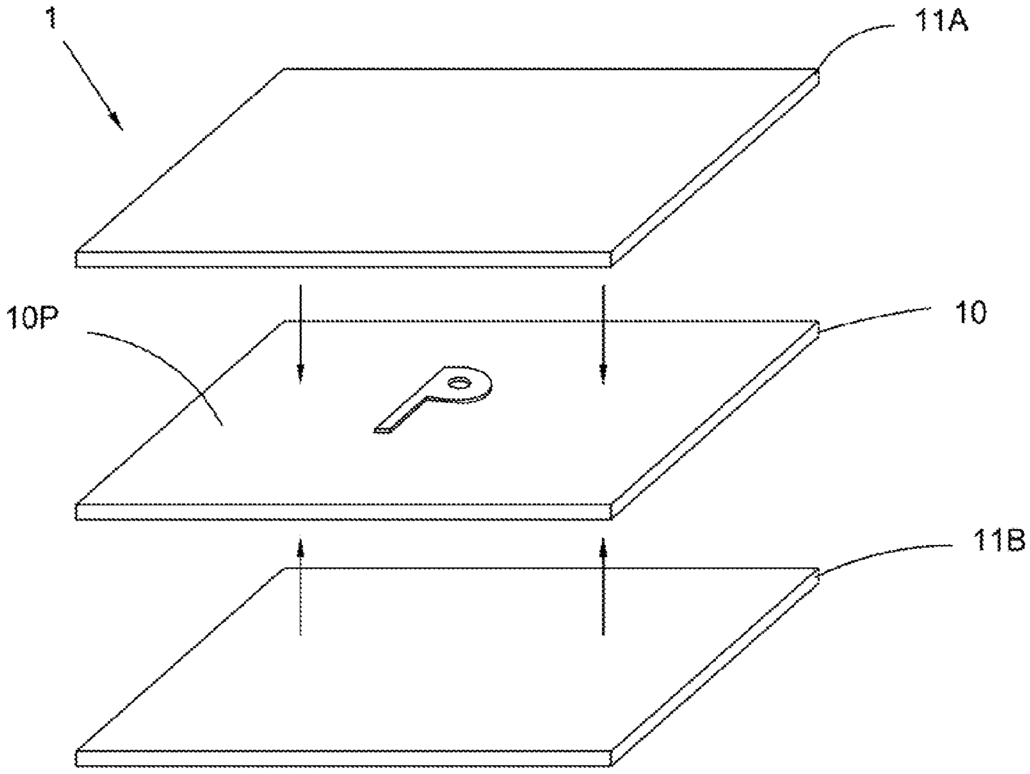
FIG. 2 is an exploded perspective view of plastic paper according to the present invention.

FIG. 2 is an exploded perspective view of plastic paper 1 according to the present invention.

Figure 3:
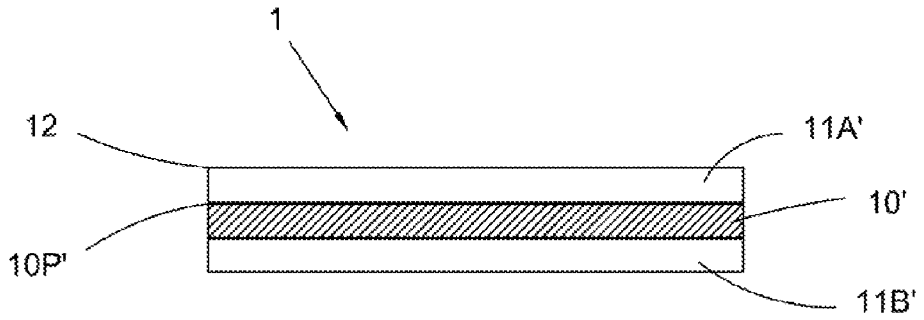
FIG. 3 is a cross-sectional view of plastic paper shown in FIG. 2.

FIG. 3 is a cross-sectional view of plastic paper 1 shown in FIG. 2.

Figure 4:
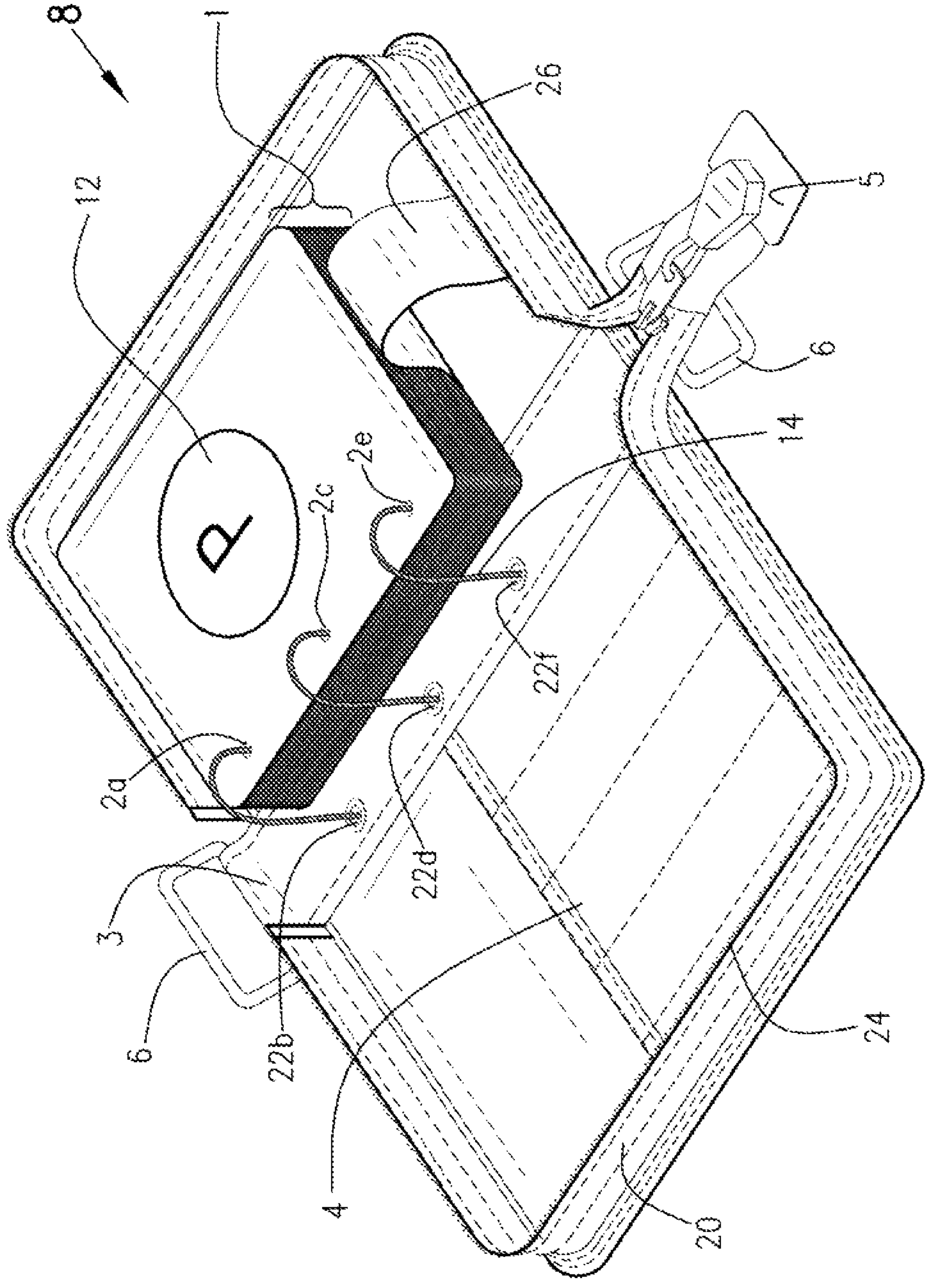
FIG. 4 is a perspective view of a writing kit shown in FIG. 1 with the case opened.

FIG. 4 is a perspective view of writing kit 8 with the case opened.

Figure 5:
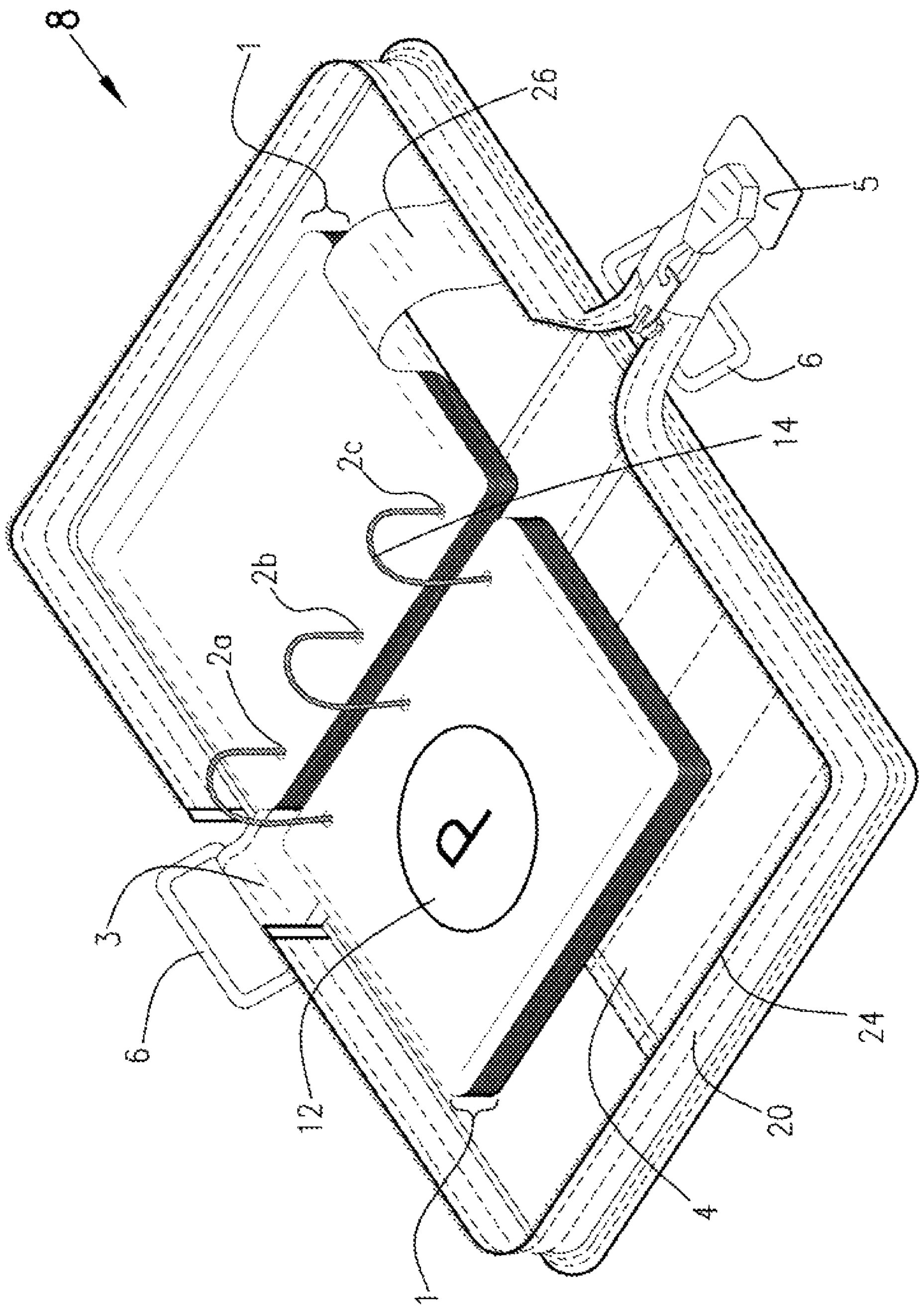
FIG. 5 is a perspective view of a writing kit shown in FIG. 1 with the case opened and the pages partially turned.

FIG. 5 is a perspective view of writing kit 8 with the case opened and the pages partially turned.

Figure 6:
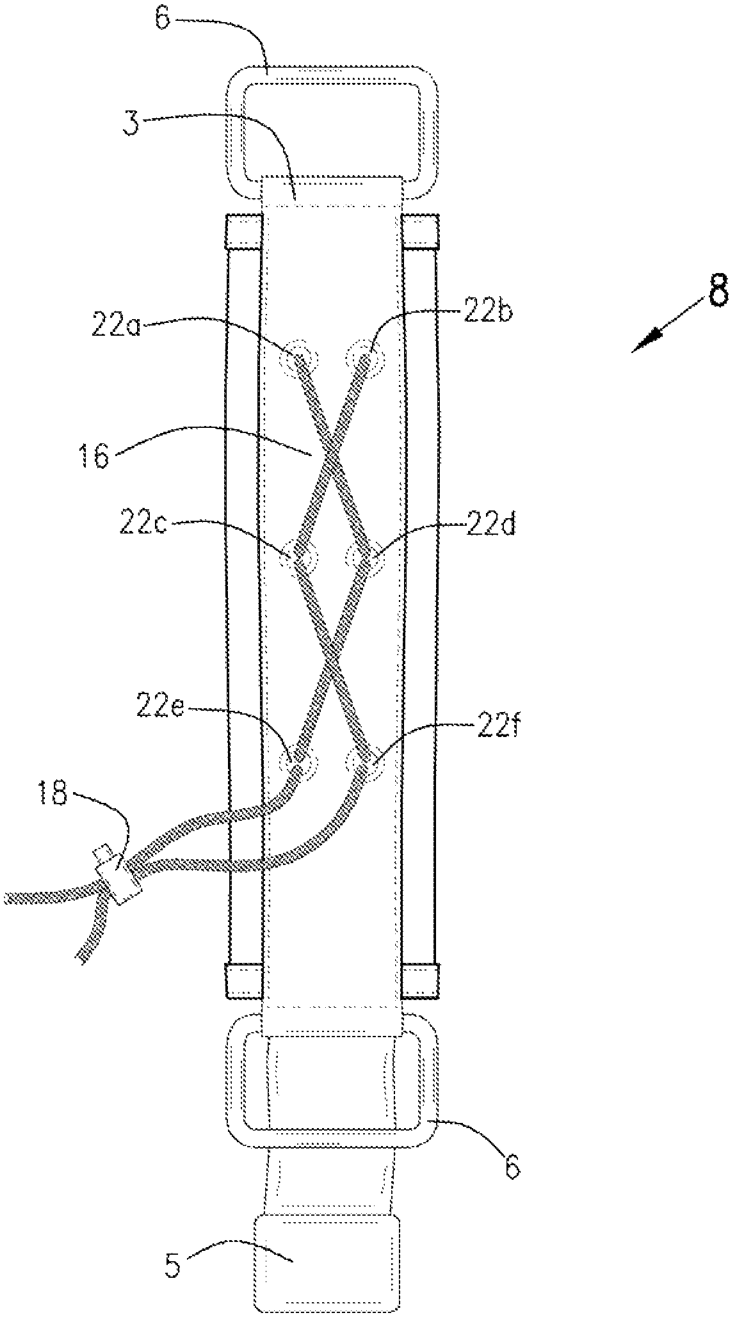
FIG. 6 is a rear elevational view of a writing kit shown in FIG. 1 with the case closed.

FIG. 6 is a rear elevational view of writing kit 8 with the case closed. The following should be viewed in light of FIGS. 1 through 6. FIGS. 1 and 6 showing a rear perspective view and a rear elevation view of writing kit 8, respectively. Case 20 is shown closed by closing element 24. In FIG. 1, element 24 is a zipper. Along spine 16 columnar holes **22*a*, 22*b*, 22*c*, 22*d*, 22*e* and 22*f* provide the attachment point for binding 14 to hold plastic sheets 1 within case 20. It should be understood that kit 8 is not limited to any particular number of holes. As shown, binding 14 emerges at the rear of spine 16 after being inserted through holes 2 on plastic sheets 1 (See FIG. 4) and through holes 22. After emerging from holes 22*e* and 22*f* clasp 18 is slidingly engaged to binding cord 14. Clasp 18 holds the binding cord securely at the chosen binding tension and length. Clasp 18 is shown on the exterior of case 20, but in other aspects (not shown), clasp 18 is disposed in the interior of case 20. In some aspects, clasp 18 is secured to case 20 by tethering strip 28. Shown on each end of case 20 is attachment element 6, in this case a ring, which serves as an attachment location for the kit. Zipper 24 is closed with tab 5 that preferably has an extra long tab to increase the ease of closing and opening case 20**.

Attachment element 6 is shown attached to case 20 by loop 3 that that has been sewn into case 20. It will be appreciated that other configurations and shapes for element 6 and other means of securing element 6 to the case are included within the spirit and scope of the invention as claimed. Preferably, case 20 is constructed of a synthetic material that is durable and resilient, yet still flexible.

In some aspects, the plastic sheet includes opaque plastic layer 10 and transparent outer layers 11A and 11B. Visual information can be placed on or imbedded in layer 10. For example, in FIG. 2, printing P is printed onto a surface of the opaque plastic layer 10. Printed surface 10P is shown as the top surface, however, printing P can also be included on the rear surface (not shown) of opaque plastic layer 10. Clear layers 11A, 11B sandwich printed opaque plastic layer 10. Components 10, 11A, 11B are shown before application of temperature and pressure conditions. After such application, sheet 1 forms a solid piece, for example, of polyvinyl. Temperature and pressure conditions are applied to form a single solid sheet of polyvinyl 1 as shown in FIG. 3. In FIG. 3, plastic sheet 1 is a single solid piece is formed by layers 10, 11A, 11B which have been chemically and/or physically modified to permanently join or bond with adjoining layers. The bonded layers 10', 11A', 11B' are shown in FIG. 3. Printed surface 10P, has been formed into the protected printed surface 10P'. The invention provides a writing kit that can be relatively small and lightweight. However, it should be appreciated that the plastic sheets of the present invention may be configured in any physical size. Further, it should be understood that the present invention is not limited to any particular type of visual information. For example, visual information can include, but is not limited to, text, maps, or graphic displays.

A plastic writing sheet that has been formed in the sandwiching technique described above generates a sheet that protects print by embedding the print between two clear layers, 11A and 11B. The print is impregnated into layer 10, which creates a printed surface 10P. This may be contrasted with a situation, not according to the invention, where printing is performed on top of a plastic material; a remover solvent would remove such unprotected template printing along with the writing desired to be removed, so that the template printing desired to be left could not be assured of remaining. The present invention recognizes and addresses this problem of protecting template print, and provides for protected template print in a reusable writing surface, where the writing surface may be solid or clear (and, when clear, optionally may be overlaid and/or used with other writing sheets, maps, etc.). The protection afforded the embedded print by the present invention is protection from undesirable physical, chemical, and/or environmental effects, including, but not limited to, finger oil and pressure (deterioration from physical handling, i.e., plastic with surface print which is removed through the friction of handling), wear, weather, etc. The protection afforded the printing by the protective methods of the present invention is superior to laminated paper (where damage spreads), because damage to a protected-print product according to the present invention is relatively confined, with the user only being affected if the damage occurs in the printed area. This feature is unlike a conventional laminated paper which when perforated and exposed to water allows the paper to become saturated causing complete failure of the entire page.

In some aspects, layer 10 can be opaque, rather than embedded with visual information. It should be understood that layer 10 can include both visual information and opaque areas. Also, the present invention is not limited to any combination of sheets with visual information layers 10 and opaque layers 10.

In FIG. 4, a plurality of exemplary writing sheets 1 are shown, with the top face of writing surface 12 visible. While writing surface 12 has a printed text underneath the writing surface (layer 10, for example), it will be appreciated that a writing surface according to the invention is not required to have underlying text as shown in FIG. 5. It also should be understood that the present invention is not limited to any number of sheets 1.

In FIGS. 4 and 5, writing sheets 1 are shown having punched therein holes 2 for attaching writing sheets 1 in case 20. Holes 2 in sheets 1 are preferably along the perimeter of one side of the sheet. If it is chosen that multiple holes are disposed on sheets 1, the holes are preferably aligned along the same edge of the sheet. It should be understood that the present invention is not limited to any particular configuration of holes 2 on a single sheet 1 or to any particular configuration of holes 2 among a plurality of sheets 1. Case 20 can hold one sheet 1 or a plurality of sheets 1. In FIGS. 4 and 5, writing kit 8 is shown with multiple holes 2 in sheets 1. However, it should be appreciated that writing kit 8 is not limited to a particular number of holes 2 in a sheet 1. For example, a sheet 1 can include only a single hole 2 or more than three holes 2.

In some aspects, case 20 advantageously includes at least one pocket 4. The pocket can be used for holding various items, for example, items used with kit 8, such as a pen. Pocket 4 is also suitable for holding other tools, including, but not limited to, a pocket knife, an eraser cloth, other writing instruments, etc. In some aspects (not shown), element 24 is an arrangement of at least one button and button hole, located on opposing cover halves of the case. In some aspects (not shown), element 24 is a hook and loop closure. Element 24 enables case 20 to hold accessories (such as a writing instrument, a remover-solvent, etc.) for use with writing sheets 1.

Writing kit 8 has spine 16 position in the middle of case 20 between the two cover halves that protect writing sheets 1. Binding 14 is laced through holes 2 and case holes 22. Binding 14 is preferably constructed of a synthetic material that is supple and durable, such as a polyester cord. The cord has a preferred thickness range from about 0.05 to 0.25 inches, which is roughly the thickness of a standard hole punch, however, other thicknesses are possible. The thickness of the cord can be selected to increase the number of holes sizes with which the cord is compatible. The size of the cord, however, can be selected as necessary. In some aspects, binding 14 is made from a cord material with elastic fibers which will make the cord stretchable. This may be particularly advantageous if numerous writing sheets are desired to be bound within case 20.

Binding 14 is laced through holes 2*a*, 2*b* and 2*c* and case holes 22*a*, 22*b*, 22*c*, 22*d*, 22*e* and 22*f* with binding 14 emerging at the back of the writing kit 8. The two loose ends of binding 14 are slid through spring loaded clasp 18 as best shown in FIG. 6. Holes 22*a*, 22*b*, 22*c*, 22*d*, 22*e* and 22*f* can be reinforced by a metallic or plastic rings or eyelets that cover the edge of the hole, protecting the material of case 20 from being torn. Holes 22*a*, 22*b*, 22*c*, 22*d*, 22*e* and 22*f* are disposed on the center portion of case 20 on parallel columns on spine 16. Holes 22*a*, 22*c* and 22*e* are aligned in column 1, which is the column on the left of the rear side of spine 16 when viewing case 20 from the rear, as shown in FIG. 6. Holes 22*b*, 22*d*, and 22*f* are aligned in column 2, which is the column of holes on the right of the rear side of spine 16 when viewing case 20 from the rear, as shown in FIG. 6. However, it should be understood that other configurations of holes are included within the spirit and scope of the invention as claimed. In a preferred embodiment, binding 14 has ample length to accommodate a single writing sheet 1 or a plurality of writing sheets 1. However, it should be understood that the present invention is not limited to a particular length for the binding. A flexible binding 14 is able to conform to varying numbers of writing sheets 1. Writing kit 8 and binding 14 can be sat upon, crushed, and subjected to various other abusive conditions without failing. Binding 14, which is resilient, flexible and adjustable, enables writing kit 8 to be used in situations and environments in which conventional notebook binders can not.

In a preferred embodiment, writing kit 8 laces one end of binding 14 through the upper hole 2*a* in writing sheet(s) 1, then through the upper hole 22*a* in spine 16 of case 20. The other end of binding 14 is threaded through hole 22*b*. After both ends of binding 14 emerge from the back of spine 16 of case 20 through the holes 22*a* and 22*b*, each cord end is subsequently crisscrossed and fed through holes 22*c* and 22*d*, respectively, on the back of spine 16. After emerging from the front of spine 16, the end of binding 14 that emerges from hole 22*c* is then inserted into hole 2*b* at the back of writing sheet(s) 1, and the other end is laced over spine 16 to hole 22*d* from 22*c* (this lacing pattern can be reversed). After emerging from the top of writing sheet(s) 1 through hole 2*b*, that end of binding 14 is then laced through hole 22*d*. At this point two ends of binding 14 are at the back of spine 16 having emerged from holes 22*c* and 22*d*. Next, both ends are crisscrossed with one end of binding 14 being laced through hole 22*e* the other end through hole 22*f*. After emerging from the front side of spine 16, one end of binding 14 emerging from hole 22*e* is laced through hole 2*c* in the back of writing sheet(s) 1 and the other end is passed through hole 22*e* (this lacing pattern can be reversed). After the end of binding 14 has passed through hole 2*c* and has cleared all sheets, this end of binding 14 is then passed through hole 22*f*. Both ends of binding 14 are then united and strung through spring loaded clasp 18. It should be understood that other configurations for binding 14 are included in the spirit and scope of the invention as claimed.

Spring loaded clasp 18 is operated by depressing a button disposed within a housing, which is resisted by a spring associated with the clasp. When the button is depressed the button aligns a hole on each side of the housing with a hole that runs through the button. String or cord is inserted into the align holes and the button is released causing the cord or string to be clamped inside the housing of the clasp. Tightness of binding 14 can be adjusted using spring loaded clasp 18. To tighten binding 14, all excess in binding 14 is pulled through spring loaded clasp 18 and the clasp is drawn against spine 16. Additionally, spring loaded clasp 18 enables binding 14 to be quickly unbound and rebound with little effort. This provides writing kit 8 with the capability of adding and/or removing writing sheet(s) 1 with veritable ease. Writing kit thereby has the capacity to hold a single sheet 1 or a plurality of sheets 1.

In order to bind the plastic sheet(s) 1 in this manner it is best that sheet(s) 1 are aligned with each other and are aligned with at least one hole in case 20. If is it chosen that only one hole 2 is disposed on sheet(s) 1 to retain them inside case 20, the lacing procedure described above can be easily adapted. For instance, one end of binding 14 can be laced through sheet(s) 1 at holes 2*a, b* or *c* then continued through holes 22*a, b, c, d, e* or *f*. The other end of binding 14 is laced through a hole that is in the column of holes that are across from the hole that the first end of binding 14 was laced through. That is, if binding 14 was first laced through 22*a* in column 1 first, then the other end of binding 14 would be laced through hole 22*b* in adjacent column 2. After two ends of binding 14 have emerged at the back of spine 16, the two ends are inserted into a depressed spring loaded clasp 18 and the clasp mechanism is released to hold binding 14, and thus hold sheet(s) 1 inside case 20.

For the above-mentioned opaque layer starting material, preferably the thinnest available opaque material is used, such as the opaque materials by Klockner that are commercially available. Likewise, with the above-mentioned plastic layers to be used for sandwiching the opaque layer, preferably thin layers are used.

In a preferred embodiment, a suitable ink/remover-solvent combination for using in the present invention is any semi-permanent ink of the felt tip type. The remover-solvent can be any solvent similar to the solvent sold by Sanford Expo (spray bottle; white board cleaner). The ink to be used in the present invention preferably is provided in the form of a hand-held writing instrument with a relatively-soft ink-delivering tip, such as a felt tip pen or marker.

The remover-solvent to be used in the present invention may be provided in various forms, such as a spray (such as the Sanford spray solvent mentioned above), a solid (such as in the form of an eraser-pen, a solvent-moistened cloth, etc. In some aspects, the remover-solvent is provided in pen form, such as a separate pen from the ink pen or as the other end of the ink pen used in the invention.

The ink pen and/or the remover-solvent (or, the combination ink pen/remover-solvent pen) may be fastened, such as by a cord, to the writing surface. It will be appreciated that the ink pen and/or remover/solvent pen may be capped for protecting the pen tip, and, further, there may be provided optional additional casing or housing for protecting any pen tip when not in use.

Moreover, while the invention has been described in terms of a preferred convenient to use embodiment in which a remover-solvent/ink pen pair is used, it will be appreciated that in other embodiments of the invention, a remover solvent may not necessarily be required. For example, when using the ink pen on a plastic paper according to the invention, the ink writing may be rubbed-out by strenuous application of finger tip pressure, providing additional security by permitting erasure of the writing in an emergency in which the corresponding solvent may be unavailable. Similarly, a wax pen or a crayon can be substituted for the writing implement, and the writing can be removed by rubbing the surface of the sheet with a finger or cloth.

The writing sheet, with or without writing, according to the present invention is preferably weatherproof (rain, snow, wind, other weather), waterproof, and relatively durable (i.e., more resistant than paper to a harsh environment, such as dirt, sand, grit, general abuse, etc.). The writing sheet according to the present invention may function better in or under water than paper, and offer better performance at a wider temperature range than paper. The writing sheet may be clear, matte and colored, etc. Preferably, the finish on a writing surface is matte, such as a matte finish on a clear sheet.

In the case of a clear writing surface, the clear writing surface may be placed on top of written or printed information (such as a template, a map, etc.), the clear writing surface being removable from the written or printed information. When a clear writing surface is used, preferably a guide-mark is included on or in the clear writing surface, such as a guide-mark for aligning or properly coordinating the clear writing surface with underlying written or printed information with which the clear surface is used. A clear writing surface with such a guide-mark can be used for providing improved confidentiality, such as by permitting writing on the clear writing surface to be more stand-alone than if the under sheet information (such as a map, etc.) was required to be included on the same writing surface. Additionally, there are many practical applications in which a template on a clear sheet may be useful. A clear overlay according to the invention that is separable from a related material (such as a map) may be provided.

The writing sheets according to the present invention are designed for the express purpose of re-use. The invention thus provides a significant advantage over paper and pen, in which case the paper can be used only once, and must also be disposed of, creating a cost and logistical disadvantage.

For a writing surface according to the invention, the substrate may be of various colors or clear, may have printed thereon copy customized to suit customer specifications, or be blank. Where text is provided, the text may provide the user with information that is pertinent to the specific task which the product has been designed to help accomplish; i.e., information on the correct order of, and steps to take when tasked with completing: an operations order or a call for fire work sheet (template or text supporting template use) or the priority of work in the defense (checklist) or important information provided as bulleted reminders for executing operations in cold weather or the schematics to a five ton truck engine used for field repair (stand alone text information for use without a template).

In another embodiment of the present invention, templates may be used as text imbedded in the writing surface. Templates are areas of lined space on the product pages specifically designed for recording information, removal of the information, then recording of information, removal, etc. A template can be simple (such as a group of lined pages designed for the recording of miscellaneous notes or a patrol log), or specific and sophisticated (such as a patrol order, close air support request or reconnaissance observation report sheet). Using templates according to the present invention advantageously provides a consistent framework for addressing specific tasks, procedures and reports; facilitates force-wide adherence to standard operating procedures and intelligence gathering and reporting; reduces planning cycle time (a fill-in-the-blank or template format provides ease of use and insures standardized, complete and accurate planning and reporting; acts as a "rehearsal" trainer, creating greater proficiency with each successive use); provides a specific mechanism to disseminate counter-intelligence (makes possible insertion of false planning details, including locations, units, routes, etc., into the standardized templates along with maps, patrol journal entries, etc.).

The present invention may be used, by way of non-limiting example, in military applications including Infantry (Patrol coordination; Patrol order; Patrol overlay; Attack order; Defense order; Order annex(s); Warning order; Route card; Fire plan sketch; Range card; Call for fire; Close air support; Close in fire support; Communications and reporting templates; General information/guidelines for operations, etc.), Reconnaissance/Intelligence (Patrol coordination; Patrol order; Patrol overlay; Order annex(s); Warning order; Route card; Fire plan sketch; Range card; Call for fire; Close air support; Close in fire support; Communications and reporting; Beach survey report; Bridge report; Contact report; River/ford report; Surf observation report; General information/guidelines for operations, etc.), Operational Communications, Armor, Artillery, Combat Engineer (Enemy stores and equipment report, Water point report, Airstrip report, Bridge site report, Obstacle report, Executed demolitions report, etc.), Logistics, Maintenance, Motor Transport, etc.

The applications of the present invention include the military (e.g., Armed forces of the United States: Army, Navy, Air Force, Marines, or other armed forces) and civilian use, such as search and rescue applications, police applications, mountaineering/hiking or kayaking applications, first aid manual, a football coach's playbook, journals, date-books, calendars, telephone/address books, self-testing and other educational/teaching materials, drink/food order cards (such as for use on airlines, at restaurants, etc., especially where an embedded template may be used to match a seating plan), etc., as non-limiting examples.

The invention is particularly well-suited for the creation of copy or related writing surface pages which are coordinating but not necessarily identical. For example, writing surface pages that initially are coordinating (such as being identical, placeable on the same master underlying template, etc.) may be, e.g., (1) marked on by a marking author, with the marking author creating different marked-up sheets, followed by distribution of the marked-up sheets to respective different users; or (2) distributed to different users, who respectively mark the sheets, and return the marked sheets to someone who overlays the respective marked sheets. The invention provides the advantage that copies or variant sheets from different sources can be overlaid. Thus, the invention may be used for providing information in a manner that is advantageous for strongly and precisely communicating information from different sources, while lessening the time needed to synthesize the various sources and/or lessening the need to re-write or re-enter the information to achieve the same information effect.

Additionally, the invention also permits for information gathering and information display to be relatively secure, as may be desired in particular applications. Security can be further enhanced by including a self-destruction feature in a writing surface according to the invention, such as a component (such as a magnesium component) for igniting and burning the paper as desired.

A further advantage of the present invention may be seen in the reduction of use of traditional paper.

Thus, it is seen that the objects of the present invention are efficiently obtained, although modifications and changes to the invention should be readily apparent to those having ordinary skill in the art, and these modifications are intended to be within the spirit and scope of the invention as claimed. While the invention has been described in terms of its preferred embodiments, those skilled in the art will recognize that the invention can be practiced with modification.

What is claimed is:

1. A writing kit comprising:

at least one plastic sheet having at least one first hole;

a case having at least one second hole at a center portion of said case, and a closing element; and, a binding comprising a flexible cord and a clasp, said flexible cord laced through said at least one first hole in said at least one plastic sheet and through said at least one second hole in said case, said clasp slidingly engaged to said flexible cord, wherein the at least one second hole:

includes at least one open space, in material forming the case, formed by an edge of the at least one second hole; and, provides access to an interior of the writing kit when the writing kit is closed.

2. The writing kit of claim 1, where said plastic sheet has at least two transparent outer layers and an opaque middle layer, said outer layers and said middle layer are fused together to form one solid sheet, wherein said solid sheet has a writing surface that can receive semi-permanent ink, and from which said semi-permanent ink can be removed.

3. The writing kit of claim 2, wherein said semi-permanent ink is waterproof.

4. The writing kit of claim 1, wherein said plastic sheet is waterproof.

5. The writing kit of claim 4, wherein upon perforation, said plastic sheet remains waterproof.

6. The writing kit of claim 1, wherein said plastic sheet is clear.

7. The writing kit of claim 6, wherein said plastic sheet further comprises a guide-mark for aligning at least one item separate from, but useable with, said writing sheet.

8. The writing kit of claim 1, wherein said plastic sheet further comprises visual information permanently embedded in said sheet.

9. The writing kit of claim 8, wherein said visual information is a map.

10. The writing kit of claim 8, wherein said visual information is selected from the group consisting of: a template, a checklist and text.

11. The writing kit of claim 1, wherein said clasp is spring loaded.

12. The writing kit of claim 1, wherein said closing element is a zipper.

13. The writing kit of claim 1, wherein said closing element is at least one button.

14. The writing kit of claim 1, wherein said closing element is a hook and loop closure.

15. The writing kit of claim 1, wherein said case further comprises an end and said kit further comprising a tab on said end.

16. The writing kit of claim 1, further comprising a remover-solvent able to dissolve semi-permanent ink.

17. The writing kit of claim 1, further comprising a hand-held writing instrument able to apply a semi-permanent mark.

18. The writing kit of claim 17, wherein said writing instrument is a pen with a relatively soft ink-delivering tip.

19. The writing kit of claim 1, wherein said case further comprises a pocket.

20. A writing kit comprising:

at least one plastic sheet having at least one first hole;

a case having at least one second hole at a center portion of said case and a closing element; and, a binding comprising a flexible cord and a clasp, wherein:

the at least one second hole passes through material forming the case and is wholly surrounded by the material forming the case;

the flexible cord passes through the at least one first hole;

the flexible cord passes through the at least one second hole to emerge at an exterior of the case;

the clasp is disposed on the exterior of the case and is slidingly engaged to a portion of the flexible cord disposed at the exterior of the case, and, the at least one second hole:

includes at least one open space, in the material forming the case, formed by an edge of the at least one second hole; and, provides access to an interior of the writing kit when the writing kit is closed.

* * * * *